United States Patent [19]

Nomura et al.

[11] Patent Number: 4,472,942
[45] Date of Patent: Sep. 25, 1984

[54] TANDEM BRAKE MASTER CYLINDER WITH ANTI BOTTOMING SYSTEM

[75] Inventors: Yoshihisa Nomura; Kiyoshi Nishiwaki; Hiroshi Kawaguchi; Fujio Toba; Yoshinori Mori; Hiroaki Takeuchi, all of Toyota, Japan

[73] Assignees: Toyota Jidosha Kabushiki Kaisha; Aisin Seiki Kabushiki Kaisha, both of Aichi, Japan

[21] Appl. No.: 452,519

[22] Filed: Dec. 23, 1982

[30] Foreign Application Priority Data

Jan. 7, 1982 [JP] Japan ................ 57-1194[U]

[51] Int. Cl.³ .................................... B60T 11/20
[52] U.S. Cl. ...................... 60/562; 60/581; 60/589; 60/592
[58] Field of Search ............. 60/561, 562, 581, 582, 60/585, 588, 589, 592

[56] References Cited

U.S. PATENT DOCUMENTS

| 4,004,425 | 1/1977 | Pickering | 60/589 |
| 4,156,348 | 5/1979 | Brown | 60/589 |
| 4,191,020 | 3/1980 | Krohn et al. | 60/588 |
| 4,270,354 | 6/1981 | Koshimizu | 60/581 |
| 4,372,117 | 2/1983 | Kobayashi | 60/562 |

FOREIGN PATENT DOCUMENTS 56-154356  11/1981  Japan .................. 60/589

Primary Examiner—Robert E. Garrett
Assistant Examiner—Scott L. Moritz
Attorney, Agent, or Firm—Stevens, Davis, Miller & Mosher

[57] ABSTRACT

In a tandem type brake master cylinder having a body formed with coaxial large and small cylinder bores, a first piston member having a large land sliding in the large bore and a first small land sliding in the small bore, a second piston member having second and third small lands sliding in the small bore, a first chamber defined between the large land and the first small land, a second chamber defined between the first and the second small lands, a third chamber defined between the third small land and a closed end of the small bore, a first spring biasing the first and second piston members apart, a second spring biasing the second piston member away from the closed end of the small bore, first and second outlets opening from the second and third chambers respectively, and a means to allow fluid to pass from the first chamber to the second chamber but not back, a means is provided to prevent the first piston member and the second piston member from becoming separated by a distance greater than a certain predetermined distance.

3 Claims, 3 Drawing Figures

TANDEM BRAKE MASTER CYLINDER WITH ANTI BOTTOMING SYSTEM

BACKGROUND OF THE INVENTION

The present invention relates to a tandem type brake master cylinder for actuating the braking system of an automotive vehicle in which two independent braking systems are provided, and more particularly relates to such a tandem type brake master cylinder which is particularly well adapted to bleeding of the braking system to remove air therefrom.

There is a known type of tandem type brake master cylinder, which is constructed in outline as follows. A body is formed with an internal cavity defined by a large diameter cylinder bore and a small diameter cylinder bore coaxial with each other. A first piston member, formed with a large diameter land to engage with the large diameter cylinder bore and with a coaxial axially offset first small diameter land to engage with the small diameter cylinder bore, is fitted within this internal cavity of the body with the large diameter land slidingly mounted within the large diameter cylinder bore and the first small diameter land slidingly mounted within the small diameter cylinder bore. A second piston member, formed with a second small diameter land and a coaxial axially offset third small diameter land, is fitted within the internal cavity of the body with the second and third small diameter lands slidingly mounted within the small diameter cylinder bore. A first pressure chamber is thus defined between the large diameter land and the first small diameter land of the first piston member within the large and small diameter cylinder bores, a second pressure chamber is thus defined between the first small diameter land of the first piston member and the second small diameter land of the second piston member within the small diameter cylinder bore, and a third pressure chamber is thus defined between the third small diameter land of the second piston member and a closed end of the small diameter cylinder bore, within said small diameter cylinder bore. A first spring is fitted within the second pressure chamber and bears against the first piston member and the second piston member so as to bias the first and the second piston members apart so as to increase the size of the second pressure chamber, and a second spring is fitted within the third pressure chamber and bears against the second piston member so as to bias the second piston member in the direction away from the aforesaid closed end of the small diameter cylinder bore as to increase the size of the second pressure chamber. A first fluid outlet opens to the second pressure chamber, and this first fluid outlet leads to one of the dual independent braking systems of a vehicle to which this tandem type brake master cylinder is fitted, typically to the braking system for the rear wheels thereof. A second fluid outlet opens to the third pressure chamber, and this second fluid outlet leads to the other of the dual independent braking systems of the vehicle, typically to the braking system for the front wheels thereof. A means such as a one way valve or the like is provided for allowing fluid to pass from the first pressure chamber to the second pressure chamber but not in the reverse direction; this means may in fact be the seal between the first and the second pressure chambers, which typically is an annular rubber like seal mounted on the first small diameter land of the first piston member, which may be constructed so as to pass brake fluid from the first pressure chamber to the second pressure chamber. A means such as an appropriately positioned port is provided for communicating a brake fluid reservoir to the first pressure chamber when the first piston member is positioned at its extreme restored position; a means, which again may be an appropriately positioned port, is provided for communicating the brake fluid reservoir to the second pressure chamber when and only when the first piston member is positioned at its extreme restored position; and a means is provided for communicating the brake fluid reservoir to the third pressure chamber when and only when the second piston member is positioned at its restored position under the balancing action of the first and the second springs when the pressure in the second pressure chamber is substantially equal to the pressure in the third pressure chamber and also the first piston member is positioned at its extreme restored position.

As is well known, such a tandem type brake master cylinder can provide good and balanced braking action for both independent braking systems of the vehicle, when the first piston member is forced in the direction towards the second piston member.

However, a difficulty arises with such a prior art type of tandem type brake master cylinder, during bleeding or degassing of the conduit system associated with the braking system connected to the third pressure chamber.

In such degassing or bleeding of the second braking system of the vehicle, pressure is repeatedly applied to and released from the brake pedal of the vehicle to which said tandem type brake master cylinder is fitted by the foot of an operator in order to expel air from the second (exemplarily the front) braking system of the vehicle, with simultaneous opening of a brake bleed nipple for said second braking system. In this case, the second conduit system communicated to the third pressure chamber is not kept in the fluid tight state. On the other hand, the first conduit system connected to the second pressure chamber is continuously in the fluid tight state because the pressure generated in this conduit system can not be instantly released in a short period in which repeated pedaling action is in the phase of releasing the brake pedal. Therefore, during this pumping action for bleeding or degassing of the conduit system connected to the third pressure chamber, the pressure of the second spring and the residual brake fluid pressure within the third pressure chamber together are not sufficient substantially to move the second piston member towards the first piston member so as to recover the volume of the third pressure chamber. Thus, when the depression action and the releasing action of the brake pedal are repeated several times, the second piston member may be quickly driven to its extreme position abutting against the closed end of the small diameter cylinder bore, i.e. may be bottomed, not moving thereafter, and no bleeding of the second conduit system may be effected.

SUMMARY OF THE INVENTION

Accordingly, it is the primary object of the present invention to provide a tandem type brake master cylinder of the general type described above, which is improved so as to be well adapted for both of the conduit systems associated with the two independent braking systems of the vehicle to which said tandem type brake master cylinder is fitted to be bled in order to purge air from them, by repeated pumping action of the brake pedal of the vehicle and simultaneous coordinated opening and closing to the atmosphere of remote parts of said conduit systems.

It is a further object of the present invention to provide such a tandem type brake master cylinder as described above, which positively avoids bottoming of the second piston member against the closed end of the small diameter cylinder bore, even after repeated pumping of the brake pedal of the vehicle in order to purge the conduit system connected to the second fluid outlet communicated to the third cylinder chamber of air.

It is a further object of the present invention to provide such a tandem type brake master cylinder as described above, which reliably can be operated in the above described bleeding mode so as to expel substantially all the air present in both of the conduit systems connected to the two independent braking systems of the vehicle and leading from the first fluid outlet opening to the second pressure chamber and from the second fluid outlet opening to the third pressure chamber.

It is a further object of the present invention to provide such a tandem type brake master cylinder as described above, which provides good and reliable braking action for the vehicle to which it is fitted.

It is a further object of the present invention to provide such a tandem type brake master cylinder as described above, which provides for independent bleedability of both braking systems of the vehicle to which said tandem type brake master cylinder is fitted.

It is yet a further object of the present invention to provide such a tandem type brake master cylinder as described above, which is easily assemblable.

It is yet a further object of the present invention to provide such a tandem type brake master cylinder as described above, which is easily serviceable.

It is yet a further object of the present invention to provide such a tandem type brake master cylinder as described above, which has a long service life.

It is yet a further object of the present invention to provide such a tandem type brake master cylinder as described above, which ensures good drivability for the vehicle to which it is fitted.

According to the present invention, these and other objects are accomplished by a tandem type brake master cylinder, comprising: a brake fluid reservoir; a body formed with an internal cavity at least partly defined by a large diameter cylinder bore and a small diameter cylinder bore coaxial with and abutted to said large diameter cylinder bore, said small diameter cylinder bore being closed at its one end remote from said large diameter cylinder bore; a first piston member, formed with a large diameter land to fit slidably in said large diameter cylinder bore and with a coaxial axially offset first small diameter land to fit slidably in said small diameter cylinder bore; a second piston member, formed with a second small diameter land and a coaxial axially offset third small diameter land both slidably fitted in said internal cavity of said body; a first pressure chamber being defined between said large diameter land of said first piston member and said first small diameter land of said first piston member, a second pressure chamber being defined between said first small diameter land of said first piston member and said second small diameter land of said second piston member, and a third pressure chamber being defined between said third small diameter land of said second piston member and said closed end of said small diameter cylinder bore; a first spring fitted within said second pressure chamber and bearing against said first piston member and said second piston member so as to bias said first and said second piston members apart so as to increase the size of said second pressure chamber; a second spring fitted within said third pressure chamber and bearing against said second piston member and said closed end so as to bias said second piston member in the direction away from said closed end so as to increase the size of said second pressure chamber; a first fluid outlet opening to said second pressure chamber and a second fluid outlet opening to said third pressure chamber; means for allowing fluid to pass from said first pressure chamber to said second pressure chamber but not in the reverse direction; means for communicating said brake fluid reservoir to said first pressure chamber when said first piston member is positioned at its extreme position within said large diameter cylinder bore and said small diameter cylinder bore in the direction away from said second piston member; means for communicating said brake fluid reservoir to said second pressure chamber when and only when said first piston member is positioned at its extreme position within said large diameter cylinder bore and said small diameter cylinder bore in the direction away from said second piston member; means for communicating said brake fluid reservoir to said third pressure chamber when and only when said second piston member is positioned at its position within said small diameter cylinder bore which it assumes under the balancing action of said first and said second springs when the pressure in said second pressure chamber is substantially equal to the pressure in said third pressure chamber and also said first piston member is positioned at its extreme position within said large diameter cylinder bore and said small diameter cylinder bore in the direction away from said second piston member; and means for preventing said first piston member and said second piston member from becoming separated from one another by a distance greater than a certain predetermined distance.

According to such a structure, when pressure is being repeatedly applied to and released from the brake pedal of the vehicle to which this tandem type brake master cylinder is fitted by the foot of the operator in order to expel air from the second braking system communicated to the second fluid outlet from the third pressure chamber with a part of the system remote from the third pressure chamber being substantially opened to the atmosphere, so that brake fluid is supplied to said second conduit system to expel air therefrom, because of the provision of the means for limiting the distance by which the first and the second piston members can be separated from one another, as the first piston member moves in the direction away from the second piston member this second piston member is positively pulled in the same direction within the small diameter cylinder bore, and cannot become left behind at a position too far displaced in the direction of the closed end of the small diameter cylinder bore so as to nullify the next stepping on operation applied to the brake pedal.

Further, according to a particular aspect of the present invention, these and other objects are more particularly and concretely accomplished by a tandem type brake master cylinder as described above, wherein said predetermined distance is approximately equal to the distance between said first piston member and said second piston member, when said second piston member is positioned at its position within said small diameter cylinder bore which it assumes under the balancing action of said first and said second springs when the pressure in said second pressure chamber is substantially equal to the pressure in said third pressure chamber, and also said first piston member is positioned at its extreme position within said large diameter cylinder bore and said small diameter cylinder bore in the direction away from said second piston member.

According to such a structure, no greater separation is allowed to occur between said first and said second piston members than the separation necessarily occuring between them when the tandem type brake master cylinder as a whole is in the non operative or restored condition. Thus the anti bottoming action of the tandem type brake master cylinder according to the present invention is provided to the maximum possible extent.

Further, according to a particular aspect of the present invention, these and other objects are more particularly and concretely accomplished by a tandem type brake master cylinder of either of the sorts specified above, wherein said means for preventing said first piston member and said second piston member from becoming separated from one another by a distance greater than a certain predetermined distance comprises a rod member, one end of said rod member being fixed to one of said first and second piston members and the other end of said rod member protruding in the direction of said other one of said first and second piston members and being formed with a main portion and a head portion which is larger than said main portion, and a cup member which is coupled to said other one of said first and second piston members and extends in the direction of said one of said first and second piston members, said cup member being formed with a hole through which passes said main portion of said rod member, said hole being too small to pass said head of said rod member, said head portion of said rod member being received within said cup member.

According to such a structure, a convenient and simple construction for said means for limiting separation between said first piston member and said second piston member is provided.

Further, according to a particular aspect of the present invention, these and other objects are more particularly and concretely accomplished by a tandem type brake master cylinder of the sort described above, wherein said cup member is coupled to said other one of said first and second piston members with a certain amount of axial play being available therebetween.

According to such a structure, a certain degree of cushioning is available during the anti bottoming action of the tandem type brake master cylinder according to the present invention during bleeding of the second conduit system connected through the second fluid outlet to the third cylinder chamber, which is helpful for ensuring long service life of the tandem type brake master cylinder according to the present invention.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENT

Figure 1:
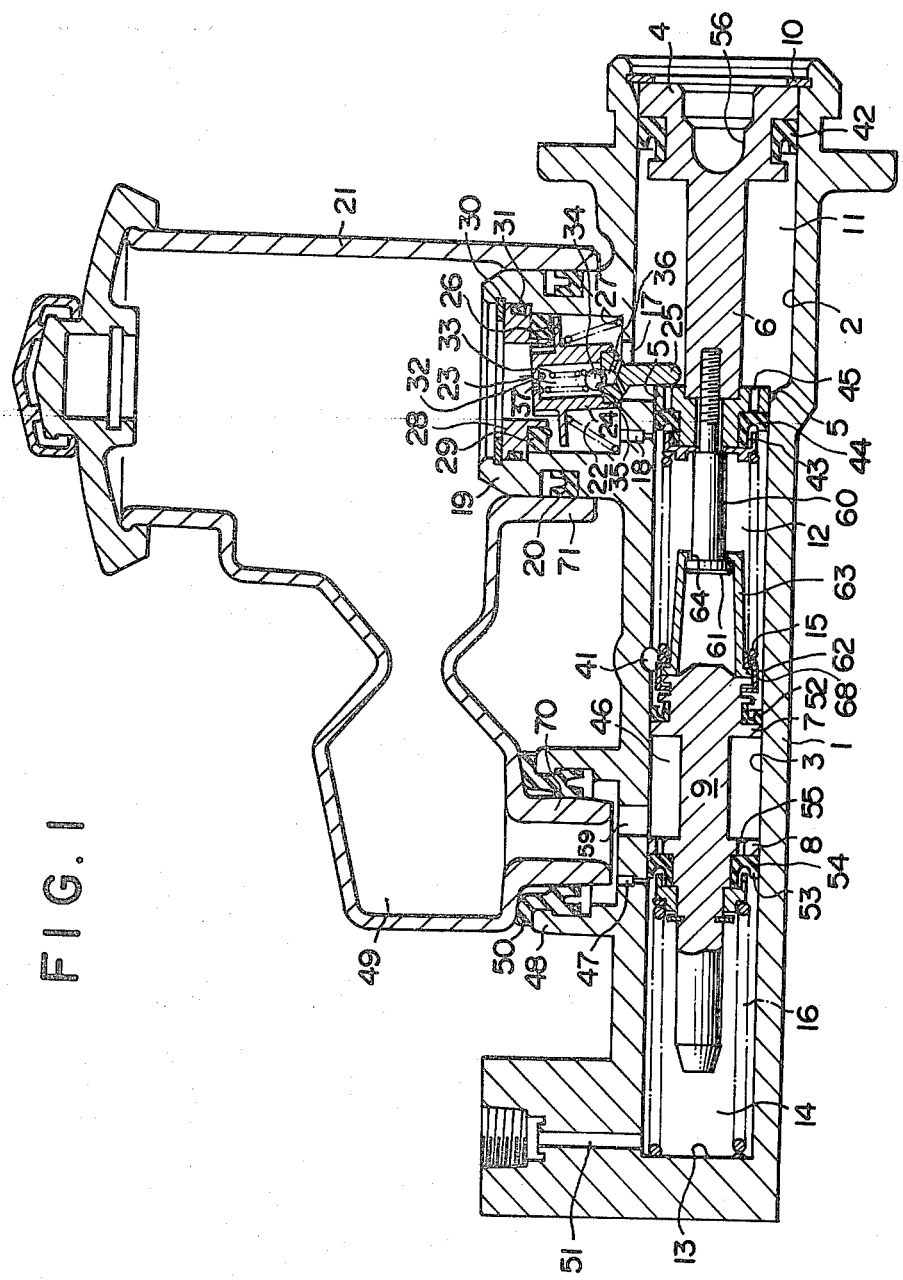
FIG. 1 is a part axial sectional part elevational view of the preferred embodiment of the tandem type brake master cylinder according to the present invention.

The present invention will now be described with reference to a preferred embodiment thereof, and with reference to the appended drawings. Referring to FIG. 1, the reference numeral 1 denotes a master cylinder body member, which is formed with a large diameter cylinder bore 2 in its right hand part in the figure and with a small diameter cylinder bore 3 in its left hand part in the figure, the two being coaxial with one another, and the diameter of the large diameter cylinder bore 2 being substantially greater than the diameter of the small diameter cylinder bore 3 as may be seen in the figure.

Extending through the large diameter cylinder bore 2 and the small diameter cylinder bore 3 there is slidingly fitted a first piston member 6, formed with a large diameter land 4 and a first small diameter land 5, these two lands being coaxial and spaced apart from one another. Further, within the small diameter cylinder bore 3 there is also slidingly fitted a second piston member 9, formed with a second small diameter land 7 and a third small diameter land 8, these two lands again being coaxial and spaced apart from one another. Movement to the right in the figure of the first piston member 6 is limited by a snap ring 10 mounted within the extreme rightmost end of the large diameter cylinder bore 2. The left hand end of the small diameter cylinder bore 3 in the figure is closed by an end wall 13.

Thus, within the open space within the master cylinder body 1 defined by the large diameter cylinder bore 2 and the small diameter cylinder bore 3 there are defined three pressure chambers whose volume varies as the first piston member 6 and the second piston member 9 move axially within this space: a first pressure chamber 11 defined between the large diameter land 4 and the first small diameter land 5 of the first piston member 6; a second pressure chamber 12 defined between the first small diameter land 5 of the first piston member 6 and the second small diameter land 7 of the second piston member 9; and a third pressure chamber 14 defined between the third small diameter land 8 of the second piston member 9 and the end wall surface 13. Further, a fluid chamber 46 is defined between the small diameter lands 7 and 8 of the second piston member 9, though the volume of this fluid chamber does not substantially vary as the second piston member 9 moves within the cylinder bore.

Between the first piston member 6 and the second piston member 9 there is mounted a compression coil spring 15, which biases these two piston members apart from one another. Between the second piston member 9 and the end wall surface 13 there is mounted a compression coil spring 16, which biases said second piston member 9 rightward in the figure. The first piston member 6 is formed with a semi spherical depression 56, adapted to receive an end of a plunger member or the like not shown in the figure, which is drivingly connected to a brake pedal of the vehicle to which the shown tandem type brake master cylinder is fitted.

From the left hand end in the figure of the first piston member 6, there projects along the axis thereof a linking rod 60 formed with an engagement flange 61 at its left hand end. On the right hand side in the figure of the second piston member 9 there is mounted, with a certain amount of play being provided therebetween as will be described shortly, a conical engaging cap 63, of approximately the same axial length as the linking rod 60. The end remote from the second piston member 9 of this conical engaging cap 63 is formed with a hole 64, through which the linking rod 60 passes, but which is too small to pass the engagement flange 61 of this linking rod 60. Accordingly, by the operation of this construction, at no time can the first piston member 6 be separated from the second piston member 9 by a greater distance than a critical distance which is approximately equal to the sum of the length of the linking rod 60 and the length of the conical engaging cap 63, at which critical separation distance the engagement flange 61 of the linking rod 60 comes into abutting contact with the side surface of the hole 64 as shown in the figure, but on the other hand the first piston member 6 can move relative to the second piston member 9 freely provided that they remain separated by less than this critical separation distance.

Figure 2:
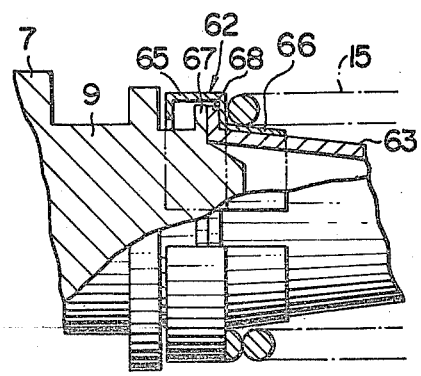
FIG. 2 is a detailed cross sectional view showing a construction by which a conical engaging cap is fixed to an end of a piston member of the tandem type brake master cylinder shown in FIG. 1 with a certain amount of play being provided therebetween.
Figure 3:
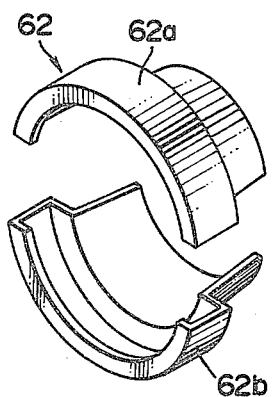
FIG. 3 is a perspective view of an engaging member incorporated in said fixing construction shown in FIG. 2, said engaging member being actually formed in two parts.

The construction by which the conical engaging cap 63 is fixed to the right hand end in the figure of the second piston member 9 with a certain amount of play being provided therebetween is shown in detailed cross sectional view in FIG. 2, and a perspective view of an engaging member 62 therefor, which is actually formed in two parts designated as 62a and 62b, is shown in FIG. 3. In fact, the engaging member 62 is formed as a hollow cone 66 abutted against a hollow cylinder 65 with annular constrictions at both of its ends, the whole being axially sectioned into two halves 62a and 62b. The cylindrical cavity within the hollow cylindrical portion 65 of the engaging member 62 is radially just large enough to receive a flange portion 67 formed on the extreme right hand end in the figure of the second piston member 9 and also a flange portion 68 formed on the left hand end in the figure of the conical engaging cap 63 which is abutted thereto, and is axially more than long enough to receive both said flange portion 67 and also said flange portion 68, the annular constrictions at the ends of the hollow cylindrical portion 65 being too small to pass said flange portion 67 or said flange portion 68. The two halves 62a and 62b of the above described engaging member 62 are fitted together in the above described position around said flanged portions 67 and 68, and then the compression coil spring 15 is fitted so as to abut and push against the side of the hollow cylinder 65, so that as a whole the combination of said engaging member 62 and said conical engaging cap 63 is fixed to the right hand end in the figure of the second piston member 9 with a certain amount of play being provided therebetween, said amount of play being determined by the excess of the axial dimension of the cylindrical cavity within the hollow cylindrical portion 65 of the engaging member 62 over the combined axial thicknesses of the abutted flange portions 67 and 68. This construction provides important advantages of constructability and assemblability.

Around the large diameter land 4 of the first piston member 6 there is provided an annular seal member 42 formed of a rubber elastomer or the like, the annular lip of said annular seal member 42. Around the first small diameter land 5 of the first piston member 6 there is provided an annular seal member 43 formed of a rubber elastomer or the like, an annular lip 44 thereof preventing passage of brake fluid from the second pressure chamber 12 in the rightwards direction past the first small diameter land 5. However, a plurality of holes 45 are provided through the first small diameter land 5 to a position behind the annular seal member 43, and these holes 45 allow passage of brake fluid leftward, while biasing the annular lip 44 from the first pressure chamber 11 to the second pressure chamber 12, thus functioning as a one way valve. Around the second small diameter land 7 of the second piston member 9 there is provided an annular seal member 52 also formed of a rubber elastomer or the like, an annular lip thereof preventing passage of brake fluid from the second pressure chamber 12 leftward past the second small diameter land 7. Finally, around the third small diameter land 8 of the second piston member 9 there is provided another annular seal member 54 also formed of a rubber elastomer or the like, an annular lip 53 thereof preventing passage of brake fluid from the third pressure chamber 14 rightward past the third small diameter land 8. However, a plurality of holes 55 are provided through the third small diameter land 8 to a position behind the annular seal member 54, and these holes 55 allow passage of brake fluid leftward, while biasing the annular lip 53 from the fluid chamber 46 to the third pressure chamber 14, thus functioning as a one way valve.

To the second pressure chamber 12 there opens a first brake fluid outlet 41, so located, in its axial position, as to be always in communication with said second pressure chamber 12. This first brake fluid outlet 41 leads via a first conduit system not shown in the figures to a brake apparatus, for example to the brake fluid pressure actuators of the rear wheel braking system of the vehicle. To the third pressure chamber 14 there opens a second brake fluid outlet 51, so located, in its axial position, as to be always in communication with said third pressure chamber 14. This second brake fluid outlet 51 leads via a second conduit system not shown in the figures to another brake apparatus of the vehicle, for example to the brake fluid pressure actuators of the front wheel braking system of the vehicle.

Above the master cylinder body 1 there is mounted a brake fluid reservoir 21, which has an extension portion 49 extending to the left in the figure. During operation of the shown tandem type brake master cylinder, this brake fluid reservoir 21 is of course filled with brake fluid. A seal member 50 is provided and seals between a tubular pipe portion 70 which extends downwards from the extension portion 49 and a tubular boss 48 formed on the upper part of the master cylinder body 1. Two ports open from the bottom of this tubular boss 48 to the interior of the master cylinder body 1: a port 59 which is always open to the fluid chamber 46; and a port 47, which is open to the third pressure chamber 14 when the second piston member 9 is in its extreme rightwardly displaced position within the small diameter cylinder bore 3 as shown in the figure, i.e. is in its restored position, but which otherwise is cut off from communication from the third pressure chamber 14 by the third small diameter land 8 of the second piston member 9 and by the seal member 54 provided thereon.

Another tubular boss 19 is formed on the upper part of the master cylinder body 1 as projecting upwards therefrom, with a bore space 22 therein. A tubular pipe portion 71 extending downwards from the brake fluid reservoir 21 is sealingly engaged via a seal member 20 to said tubular boss 19. When and only when the first piston member 6 is substantially in its restored position, brake fluid is supplied from the reservoir 21 to the bore space 22, via a valve construction 23 provided in said space 22. Two ports open from the bottom of this space 22 to the interior of the master cylinder body 1: a port 17 which is always open to the first pressure chamber 11, and a port 18, which is open to the second pressure chamber 12 when the first piston member 6 is in its extreme rightwardly displaced restored position, but which otherwise is cut off from communication from the second pressure chamber 12 by the first small diameter land 5 of the first piston member 6 and by the seal member 43 provided thereon, and may instead be communicated to the first pressure chamber 11, although this is functionally unimportant.

Within the space 22 there is provided a valve body 24 formed as a hollow tube with a central hole 32 bored along its axis, and with an axially intermediate radially extending annular flange 26 extending from its peripheral surface and with an actuating lever 25 extending substantially axially downwards in the figure from its lower end. A compression coil spring 27 is provided within the space 22, and is compressed between the lower end of this space 22 and the lower surface of the annular flange 26 of the valve body 24. Accordingly the valve body 24 is biased upwards by this compression coil spring 27, and thereby the upper surface of this radially extending annular flange 26 is pressed against a valve seat 29 formed of a rubber material or the like provided around the upper opening between the space 22 and the interior space of the brake fluid reservoir 21, and supported by a valve seat ring 28 held in place by a retainer ring 30 and sealed around its outer periphery by an O ring 31. Accordingly, provided that the valve body 24 is not tilted away from this upwardly biased position by the actuating lever 25 being pushed sideways, the space 22 is sealed off from the space within the brake fluid reservoir 21 by the mating between the flange 26 and the valve seat 29; but, on the other hand, if and when the valve body 24 is tilted away from its upwardly biased position by the actuating lever 25 being pushed sideways, the space 22 is communicated to the space within the reservoir 21.

The actuating lever 25 protrudes through the port 17 into the first pressure chamber 11, and is so arranged that, when and only when the first piston member 6 is substantially in its restored position as shown in the figure, this actuating lever 25 is nudged somewhat to the right in the figure, so as to communicate the space within the brake fluid reservoir 21 with the space 22 within the boss 19 which is at this time communicated both with the first pressure chamber 11 via the port 17 and also with the second pressure chamber 12 via the port 18. Accordingly, by the operation of this valve construction 23 the brake fluid present in the brake fluid reservoir 21 is supplied to the first pressure chamber 11 and the second pressure chamber 12 when the first piston member 6 is in its restored position.

A relief valve construction is also provided as incorporated within this valve assembly 23. The central hole 32 within the valve body 24 is communicated via a hole 37 in the upper end of the valve body 24 with the space within the brake fluid reservoir 21, and is communicated via a passage 36 with the space 22. Within the hole 32 there is provided a compression coil spring 33, which at its upper end presses against the lower side of the periphery of the hole 37, and which at its lower end presses against a valve ball member 34, thus biasing it against the upper end 35 of the passage 36, which functions as a valve seat. Thus, when the brake fluid pressure within the space 22 comes to exceed atmospheric pressure by more than a predetermined amount, then the valve ball member 34 is biased away from said upper end of said passage 36 by said pressure excess, and thus said space 22 becomes communicated with the space within the brake fluid reservoir 21, allowing said pressure excess to be vented.

This tandem type brake master cylinder according to the present invention described above operates as follows.

Before any pressure is applied by the brake pedal linkage to the right hand end in the figure of the first piston member 6, both the first piston member 6 and the second piston member 9 are in their restored positions as seen in FIG. 1, and in this state the brake fluid at atmospheric pressure within the brake fluid reservoir 21 is substantially freely communicated via the opening between the valve seat 29 and the flange 26 and via the port 17 to the first pressure chamber 11, and via the port 18 to the second pressure chamber 12, and via the port 47 to the third pressure chamber 14. Thus, the first pressure chamber 11, the second pressure chamber 12, and the third pressure chamber 14 are all filled with brake fluid at substantially atmospheric pressure, and accordingly both the first conduit system communicated to the outlet 41 from the second pressure chamber 12 and also the second conduit system communicated to the outlet 51 from the third pressure chamber 14 are supplied with brake fluid at substantially atmospheric pressure.

Now, when the plunger (not shown) is driven to the left in the figure by the brake pedal being stepped upon, and pushes into the depression 56 of the first piston member 6, this causes the first piston member 6 to be driven to the left. Almost immediately, as soon as the first piston member 6 has substantially moved from its shown restored position, the port 18 becomes no longer communicated to the second pressure chamber 12 and also the first small diameter land 5 of the first piston member 6 ceases to nudge the actuating lever 25 of the valve body 24, so that the valve body 24 ceases to be tilted aside as shown in FIG. 1 and instead by the biasing action of the compression coil spring 27 is biased to its position in which the annular radially extending flange 26 is pressed against the valve seat 29 around its entire periphery and thus seals off the space 22 from the space within the brake fluid reservoir 21.

From this state, during a first portion of the motion of the first piston member 6 in which the pressure within this space 22 remains less than the aforementioned predetermined critical pressure value which is just sufficient to bias the valve ball member 34 away from the upper end of the passage 36 to communicate said space 22 with the space within the brake fluid reservoir 21, the brake fluid within the first pressure chamber 11 is squeezed by a volume amount per unit movement of the first piston member 6 which corresponds to the difference between the cross sectional area of the large diameter cylinder bore 2 and the cross sectional area of the small diameter cylinder bore 3, and since this brake fluid is substantially incompressible it is forcibly driven through the plurality of holes 45, and past the annular seal member 43 so as to be expelled into the second pressure chamber 12. The brake fluid within the second pressure chamber 12 is expelled through the outlet 41 and through the first conduit system (not shown) to actuate the first braking system (also not shown) of the vehicle, i.e. exemplarily the rear braking system of the vehicle. As the first braking system of the vehicle resists this supply of brake fluid to the actuators thereof, the pressure within the second pressure chamber 12 increases; and this increase of pressure, along with the increased compression action of the compression coil spring 15 due to its compression by the movement of the first piston member 6, pushes the second piston member 9 to the left in the figure from its shown restored position against the compression action of the compression coil spring 16 and against the pressure in the third pressure chamber 14, which also of course begins to rise, as soon as the third small diameter land 8 of the second piston member 9 has moved sufficiently (a very small amount) to cause the communication between the port 47 and the third pressure chamber 14 to be interrupted. The brake fluid within the third pressure chamber 14 is expelled through the outlet 51 and through the second conduit system (not shown) to actuate the second braking system (also not shown) of the vehicle, i.e. exemplarily the front braking system of the vehicle. As the second braking system of the vehicle resists this supply of brake fluid to the actuators thereof, the pressure within the third pressure chamber 14 also increases. Thus, the position of the second piston member 9 is determined by a balance between the increased pressure in the second pressure chamber 12, the increased pressure in the third pressure chamber 14, and the increased pressures of the compression coil springs 15 and 16 due to their increased amounts of compression.

Accordingly, by this expulsion of brake fluid through the outlet 41 and through the first conduit system (not shown) to actuate the first braking system (not shown) of the vehicle, and by this expulsion of brake fluid through the outlet 51 and through the second conduit system (not shown) to actuate the second braking system (also not shown) of the vehicle, both of the two braking systems of the vehicle, i.e. the front braking system and also the rear braking system, are actuated at the same time. Further, because of the abovementioned balancing action which determines the position of the second piston member 9, a good anti-skid effect is provided for the braking system of the vehicle, while maintaining the first and the second conduit system separated so that in the event of leakage of either one thereof the other one may be able to provide uninterrupted braking action, which thus guarantees braking action for the vehicle.

During the above mentioned braking operation, during a second portion of the motion of the first piston member 6 after the pressure within the space 22 has risen to become equal to the aforementioned predetermined critical pressure value which is just sufficient to bias the valve ball member 34 away from the upper end of the passage 36 so as to communicate said space 22 with the space within the brake fluid reservoir 21, the brake fluid within the first pressure chamber 11, which as mentioned before is squeezed by a volume amount per unit movement of the first piston member 6 which corresponds to the difference between the cross sectional area of the large diameter cylinder bore 2 and the cross sectional area of the small diameter cylinder bore 3, now is able to escape through the hole 36 back to the brake fluid reservoir 21, rather than being driven through the holes 45 formed in the first small diameter land 5 and past the annular seal member 43 so as to be expelled into the second pressure chamber 12, as was the case during the above described first portion of the motion of the first piston member 6. By this arrangement the slack in the braking system, i.e. the distance through which the braking members such as the brake shoes or pads need to be moved before proper pressing contact is established with the braked members such as the brake drums or disks is taken up quickly, and a good braking effect is obtained thereafter.

When the plunger (not shown) ceases to be driven to the left in the figure by the brake pedal, the first piston member 6 and also the second piston member 9 are driven to the right in the figure, toward their restored positions as seen in FIG. 1, by the compression coil springs 15 and 16 which are now unopposed. At this time, almost immediately the pressure in the first pressure chamber 11 starts to become negative, but as soon as this happens the negative pressure therein sucks the valve body 24 so as to displace a part of the annular flange 26 away from the valve seat 29, thus allowing brake fluid to flow from the brake fluid reservoir 21 into the space 22 and into the first pressure chamber 11. When the first piston member 6 has substantially returned to its restored position as seen in FIG. 1, then the port 18 becomes communicated to the second pressure chamber 12 again, and thereafter an amount of brake fluid corresponding to the amount of brake fluid which had flowed through the holes 45 and past the annular seal member 43 from the first pressure chamber 11 to the second pressure chamber 12 during the first portion of the application period of the brake apparatus flows back from the first conduit system through the port 18 to return to the brake fluid reservoir 21. Thus the entire tandem type brake master cylinder returns to its released or restored condition as a whole, with, as before, the valve body 24 being tilted away from its upwardly biased position.

During the above described sequence of processes of applying and releasing braking action, the coupling arrangement provided between the first piston member 6 and the second piston member 9 for limiting the distance by which these members can be separated from one another, incorporating the linking rod 60 and the conical engaging cap 63, is not deployed. This is because during such normal operation the first piston member 6 and the second piston member 9 are at their maximum distance apart when these two members are in their restored positions as shown in FIG. 1, while during any other condition of the braking system the distance between the first piston member 6 and the second piston member 9 is less than this maximum distance. Thus no particular problem is caused during normal braking operation by the incorporation of the coupling arrangement in the tandem type brake master cylinder according to the present invention.

When the first braking system including the first conduit system not shown in the figures which is communicated through the brake fluid outlet 41 to the second pressure chamber 12 is to be degassed, part of the system remote from the tandem type brake master cylinder is substantially opened to the atmosphere, and the brake pedal (not shown) is repeatedly stepped on and released. This generates flowing of brake fluid through said first conduit system and expels any air contained therein as the repetitive stepping on and releasing of the brake pedal is carried on. In this case, the return of the first piston member 6 to the restored position as shown in FIG. 1 is readily accomplished, when the stepping on action on the brake pedal has been released, by the action of the compression coil spring 15, because supply of brake fluid to the first pressure chamber 11 is readily made through the same one way valve structure provided by the valve body 24. On the other hand, when the second conduit system connected to the third pressure chamber is to be degassed, during the pumping action applied to the piston member 6, the pressure of the compression coil spring 16 alone is not sufficient to return the second piston member 9 quickly rightward in the figure when the stepping on action on the brake pedal has been released and as the first piston member 6 is returned toward its restored position because of the flow resistance of the brake fluid in the second conduit system and which retains such rightward motion of the second piston member 9 even when a part of the second conduit system remote from the third pressure chamber 14 is substantially opened to the atmosphere. Further, it is not known from the outside whether the second piston member 9 has been returned to its restored position or not when the brake pedal has been released for a certain short time. However, because of the provision of the coupling arrangement incorporating the linking rod 60 and the conical engaging cap 63 between the first piston member 6 and the second piston member 9 for limiting the distance by which these members can be separated from one another, when the pressure on the brake pedal is released, so that the first piston member 6 is allowed to move rightward, as the first piston member 6 moves rightward, the second piston member 9 is positively pulled rightward, and cannot become left behind at a position too far displaced to the left within the small diameter cylinder bore 3, so as to nullify the next stepping on operation applied to the brake pedal. According to this positive restoring action for the second piston member 9, the effectiveness of the pumping action on the brake pedal in order to bleed the second conduit system is guaranteed.

The significance of forming the engaging member 62 in two parts such as the halves 62a and 62b is that this contributes to easy manufacturability, assemblablity, and serviceablity of the tandem type brake master cylinder according to the present invention as a whole. And the significance of mounting the conical engaging cap 63 to the second piston member by the shown construction which allows a certain amount of axial play therebetween is that this provides a certain cushioning action during the anti bottoming action of the construction for limiting the distance between the first and second piston members, which accordingly extends and enhances the service life of the tandem type brake master cylinder according to the present invention as a whole.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. A tandem type brake master cylinder, comprising:
   (a) a brake fluid reservoir;
   (b) a body formed with an internal cavity at least partly defined by a large diameter cylinder bore and a small diameter cylinder bore coaxial with and abutted to said large diameter cylinder bore, said small diameter cylinder bore being closed at its one end remote from said large diameter cylinder bore;
   (c) a first piston member, formed with a large diameter land to fit slidably in said large diameter cylinder bore and with a coaxial axially offset first small diameter land to fit slidably in said small diameter cylinder bore;
   (d) a second piston member, formed with a second small diameter land and a coaxial axially offset third small diameter land both slidably fitted in said internal cavity of said body;
   (e) a first pressure chamber being defined between said large diameter land of said first piston member and said first small diameter land of said first piston member, a second pressure chamber being defined between said first small diameter land of said first piston member and said second small diameter land of said second piston member, and a third pressure chamber being defined between said third small diameter land of said second piston member and said closed end of said small diameter cylinder bore;
   (f) a first spring fitted within said second pressure chamber and bearing against said first piston member and said second piston member so as to bias said first and said second piston members apart so as to increase the size of said second pressure chamber;
   (g) a second spring fitted within said third pressure chamber and bearing against said second piston member and said closed end so as to bias said second piston member in the direction away from said closed end so as to increase the size of said second pressure chamber;
   (h) a first fluid outlet opening to said second pressure chamber and a second fluid outlet opening to said third pressure chamber;
   (i) means for allowing fluid to pass from said first pressure chamber to said second pressure chamber but not in the reverse direction;
   (j) means for communicating said brake fluid reservoir to said first pressure chamber when said first piston member is positioned at its extreme position within said large diameter cylinder bore and said small diameter cylinder bore in the direction away from said second piston member;
   (k) means for communicating said brake fluid reservoir to said second pressure chamber when and only when said first piston member is positioned at its extreme position within said large diameter cylinder bore and said small diameter cylinder bore in the direction away from said second piston member;
   (l) means for communicating said brake fluid reservoir to said third pressure chamber when and only when said second piston member is positioned at its position within said small diameter cylinder bore which it assumes under the balancing action of said first and said second springs when the pressure in said second pressure chamber is substantially equal to the pressure in said third pressure chamber and also said first piston member is positioned at its extreme position within said large diameter cylinder bore and said small diameter cylinder bore in the direction away from said second piston member; and (m) means for preventing said first piston member and said second piston member from becoming separated from one another by a distance greater than a certain predetermined distance while freely allowing said two piston members to approach one another within said predetermined distance, comprising a rod member including a main portion and a head portion which is larger than said main portion, one end of said rod member opposite to said head portion being fixed to one of said first and second piston members and the other end of said rod member including said head portion protruding in the direction of the other one of said first and second piston members, a cup member having a flanged end abutted to said other one of said first and second piston members and a tapered hollow portion extending from said flanged end toward another end thereof in the direction of said one of said first and second piston members, said other one of said first and second piston members having a flanged end against which said flanged end of said cup member is abutted, said another end of said cup member being formed with a hole through which passes said main portion of said rod member, said hole being too small to pass said head portion of said rod member, said head portion of said rod member being received within said tapered hollow portion of said cup member, and an engaging member which comprises two half pieces which, as mated together, provide an annular element including a ring portion having an inversely U-shaped cross-section having two opposite flange portions so as to engage around the abutted flanged ends of said cup member and of said other one of said first and second piston members and a tapered hollow portion extending from one side of said ring portion so as to engage around said tapered hollow portion of said cup member, one end of said first spring being fitted around said engaging member to contact with both said ring portion and said tapered portion thereof so as to hold said half pieces of said engaging member in their mated condition.

2. A tandem type brake master cylinder according to claim 1, wherein said predetermined distance is approximately equal to the distance between said first piston member and said second piston member, when said second piston member is positioned at its position within said small diameter cylinder bore which it assumes under the balancing action of said first and said second springs when the pressure in said second pressure chamber is substantially equal to the pressure in said third pressure chamber, and also said first piston member is positioned at its extreme position within said large diameter cylinder bore and said small diameter cylinder bore in the direction away from said second piston member.

3. A tandem type brake master cylinder according to claim 1, wherein the axial inside distance between said opposite flange portions of said ring portion of said engaging member is larger than the sum of the thickness of said abutted flanged ends of said cup member and of said other of said first and second piston members.

* * * * *